United States Patent [19]

Horbury et al.

[11] 3,858,303
[45] Jan. 7, 1975

[54] METHOD OF BRAZING

[75] Inventors: Eric Anthony Horbury, Quorn; David Ronald Evetts, Nottingham, both of England

[73] Assignee: Rolls-Royce (1971) Limited,, London, England

[22] Filed: Apr. 13, 1973

[21] Appl. No.: 350,965

[30] Foreign Application Priority Data
Apr. 20, 1972   Great Britain .................... 18351/72

[52] U.S. Cl. .................................... 29/490, 148/22
[51] Int. Cl. ............................................ B23k 31/00
[58] Field of Search ............... 29/490, 491; 148/22; 117/5.5

[56] References Cited
UNITED STATES PATENTS

| | | | |
|---|---|---|---|
| 2,121,606 | 6/1938 | McCulloch | 148/22 X |
| 2,531,440 | 11/1950 | Jordan | 252/28 |
| 2,812,275 | 11/1957 | Berea | 148/22 |
| 3,110,102 | 11/1963 | Pfefferkorn | 29/490 |
| 3,623,921 | 11/1971 | Behringer | 148/22 |
| 3,647,730 | 3/1972 | Rott | 117/5.5 X |

*Primary Examiner*—Gerald A. Dost
*Attorney, Agent, or Firm*—Cushman, Darby & Cushman

[57] ABSTRACT

A method of brazing comprises coating at least part of at least one surface in the vicinity of a brazing operation, which surface is in danger of having the products of the brazing operation deposited thereon and which is to be protected from contamination from the products, with at least one layer of a composition comprising a mixture of an organophilic cation-modified clay and a volatile organic vehicle. Substantially all of the organic vehicle is removed from the coating before the brazing operation is effected. The composition may also contain a non-volatile organic additive and a non-volatile refractory oxide additive.

21 Claims, No Drawings

METHOD OF BRAZING

This invention relates to a method of brazing. The term "brazing" is to be understood as including low, intermediate and high temperature brazing. Low and intermediate temperature brazing covers the brazing of metals melting in the range 600°–900°C and the heating method is generally by torch or induction heating in air. High temperature brazing covers the brazing of metals which melt above 900°C and is generally carried out in a furnace. The usual furnace atmosphere are hydrogen or vacuum.

The term "metal" as used herein includes alloys.

One of the problems encountered in brazing is the contamination of metal surfaces in the immediate vicinity of the operation with the molten products produced during the operation. Such contamination is difficult to remove and normally expensive and inconvenient operations such as grinding or machining are utilised in order to restore the contaminated surfaces to their original condition. It is an object of the present invention to provide a method of brazing in which metal surfaces in the vicinity of the brazing operation are protected from the molten products thereof.

According to the present invention, a method of brazing comprises the steps of coating at least part of at least one surface in the vicinity of a brazing operation, which surface is in danger of having the products of said brazing operation deposited thereon and which is to be protected from contamination by said products, with at least one layer of a composition comprising a mixture of an organophilic cation-modified clay (as hereinafter defined) and a volatile organic vehicle, removing substantially all of said vehicle from said coating to leave a film of said clay on said at least one surface, and effecting said brazing operation.

The term "organphilic cation-modified clay" as used herein means a clay modified by covering the greater part of the surface of the particles of the clay with alkyl or aryl organic radicals coupled to the clay ionically by means of an onium base.

An onium compound has been defined in Hackh's Chemical Dictionary — Second Edition — as "A group of organic compounds of the type RXHy which are isologs of ammonium and which contain the element X in its highest valency; where X is pentavalent as in ammonium, phosphonium, arsonium and stibonium, where X is tetravalent as in oxonium, sulphonium, selenonium and stanonium compounds and, where X is trivalent, as in iodonium compounds."

They may be considered as addition compounds, this being further described under the heading of oxonium, carbonium, stibonium, — inium, and —ylium.

The cation-modified clay may be produced for example by converting the organic bases to the salts formed by the addition of an acid such as hydrochloric acid or acetic acid dissolved in water, and adding the selected onium compounds to an aqueous clay dispersion.

The clays to be used in the preparation of the organophilic cation-modified clay have an exchangeable inorganic cation and are preferably those which originally exhibit a base exchange capacity of at least 40 millilitres per 100 grams of the clay, for example the bentonite group of clays which are composed principally of minerals of the montmorillonite group (including montmorillonite, hectorite, saponite and montronite) are particularly suitable. Other base exchange materials may however be used.

Furthermore, an organophilic cation-modified clay which may be used in accordance with the invention is one obtained by reacting a clay, in which at least some of the exchangeable ions, other than sodium, have been replaced by sodium ions, with an onium compound.

Details of the preparation of organophilic cation-modified clays are given in United Kingdom Specifications Nos. 664, 830, 782, 724, and 904, 880 and in U.S. Pat. No. 2,531,440.

Examples of organophilic cation-modified clays which may be used are dimethyldioctadecyl ammonium montmorillonite, dodecylamine montmorillonite and dimethyldioctadecyl ammonium hectorite.

The volatile liquid organic vehicle facilitates the application and deposition of a film of the organophilic clay on the surface to be protected. As the vehicle is to be removed (from the coating composition applied to the surface to be protected) prior to the commencement of the brazing process, organic vehicles of low and medium boiling point are preferred to those of high boiling point. Among liquid organic vehicles of low boiling point (i.e., boiling under 100°C at atmospheric pressure) mention may be made of aliphatic and alicyclic compounds (including halogenated compounds), such as ethyl alcohol (including methylated spirit), methyl acetate, butyl chloride, trichloroethylene, 1:1:1-trichloroethane, acetane and cyclohexane, as well as aromatic compounds such as benzene and petroleum naphtha. Medium boiling point organic vehicles (i.e., those boiling between 100° and below 150°C at atmospheric pressure) including n-amyl alcohol, n-butyl acetate and cyclohexanone as well as toluene, xylenes, monochlorobenzenes and tetrahydrofurfuryl alcohol. High boiling point organic vehicles including acetonyl acetonate, butyl butyrate and benzyl alcohol. Examples of other volatile liquid organic vehicles suitable for use in accordance with the invention are given in "Industrial Solvents" by I. Melan (1950) p.36 to 42.

It may be possible in practice to use two or more volatile vehicles.

Preferably the coating composition also contains an additive which is a non-volatile organic substance having adhesive properties and capable of forming a dry film when mixed with the organophilic cation-modified clay.

We have found that acrylic resins (e.g., "Bedacryl" 122X manufactured by Imperial Chemical Industries Limited, the word "Bedacryl" being a Registered Trade Mark) are suitable for use as non-volatile organic additives in coating compositions according to the present invention. More than one such organic additive may be used in the coating composition if desired and it may be convenient in an organic solvent — particularly when the commercially available form of the organic additive comprises the additive in an organic solvent (as is the case for example, with "Bedacryl" 122X).

The coating composition may also contain an additive which is a non-volatile simple or complex refractory oxide having filling properties and capable of forming a dry film when mixed with the organophilic cation-modified clay. The addition of such an oxide improves the covering power of the composition. More than one such refractory oxide may be added to the coating composition if desired.

The proportions of said clay, volatile vehicle, non-volatile organic additive and non-volatile refractory oxide additive to be employed in coating compositions to be used according to the method of the invention portions in the coating compositions used in the examples:

| CON.* | ORGANOPHILIC MODIFIED CLAY (a) | | OIL SOLUBLE DYE (b) | | VOLATILE LIQUID ORGANIC VEHICLE (c) | | NON VOLATILE ORGANIC ADHESIVE SUBSTANCES (d) | |
|---|---|---|---|---|---|---|---|---|
| No. | Type | Wt | Type | Wt | Type | Wt | Type | Wt |
| 1 | Dimethyldioctadecyl Ammonium Hectorite ('Bentone 38') | 200 gms | — | — | Isopropyl Alcohol | 1000gms | — | — |
| 2 | Dimethyldioctadecyl Ammonium Montmorillonite (Bentone 34) | 100 gms | Waxoline Red | 2 gms | Trichlorethylene | 1000 gms | — | — |
| 3 | Bentone 34 | 200 gms | — | — | Isopropyl Alcohol | 1000 gms | Bedacryl 122x | 50gms |
| 4 | Bentone 38 | 75 gms | Waxoline Green | 2 gms | Toluene | 1000 gms | — | — |
| 5 | Bentone 34 | 225 gms | Waxoline Red | 2 gms | Isopropyl Alcohol | 1000 gms | Bedacryl 122x | 50 gms |
| 6 | Zeolitic Clay (Bentone 27) | 250 gms | — | — | Isopropyl Alcohol | 1000 gms | — | — |
| 7 | Dimethyldioctadecyl Ammonium Montmorillonite (Bentone 34) | 200 gms | Waxoline Red | 2 gms | Isopropyl Alcohol | 1000 gms | Bedacryl 122x | 50 gms |
| 8 | Bentone 34 | 175 gms | — | — | Butyl Alcohol | 1000 gms | — | — |

*CON. - Abbreviated for Constituent
Constituent 7 also contains 100 grams of Titanium Dioxide
Constituent 8 also contains 60 grams of Zirconium Silicate may be varied within wide limits, preferably 2 to 50 parts by weight of said organophilic cation-modified clay, 50 to 300 parts by weight of volatile vehicle 0 to 50 parts by weight of non-volatile additive and 0 to 50 parts by weight of non-volatile refractory oxide additive. The criterion in determining these proportions is the ease with which an adequate film of the organophilic cation-modified clay (and the non-volatile additive and non-volatile refractory oxide additive when present) is formed on the metal surface. Generally speaking the film of the dried coating should not be less than 5 microns in thickness, but preferably is from 15 to 40 microns. In practice however it is usually more convenient to apply a minimum number of coatings to the metal and a coating composition having a concentration of about 200 grams of organophilic cation-modified clay per litre of volatile organic vehicle may be used with advantage.

In processes according to the invention in which a non-volatile organic additive and a non-volatile refractory oxide additive form part of the coating composition, good results have been obtained when the ratio of the weight of said organophilic cation-modified clay to the weight of said non-volatile organic additive is from 1:1 to 1:4.

The following method of preparation was used for the coating composition in the examples:

A weight of the organophilic cation-modified clay (constituent (a)) was milled with a weight of oil soluble dye (if used) (constituent (b)) as a witness of coverage, a weight of non-volatile refractory oxide additive (if used) (constituent (e)) and three fifths of the weight of the volatile liquid organic vehicle (constituent (c)) in a stainless steel ball mill for four hours. The mixture was diluted with the remaining liquid organic vehicle and a weight of non-volatile organic adhesive substance (constituent (d)) if used. The mixture was further milled for half an hour.

The following table shows the constituents and pro-

Example 1

Preparation (1) was prepared according to the previously described method. Two rectangular blanks of steel containing 18 percent of chromium and 8 percent of nickel were bent through 90° so as to present a vertical surface and were treated as follows:

1. The metal surfaces being particularly greasy were paraffin washed and then degreased with trichlorethylene vapour to remove organic materials. Paint was removed by a suitable paint stripper.
2. As soon as possible after step (1) one vertical surface of one was painted with one coat of the mixture prepared as above, so that an area was left unpainted at the top of the specimen. The coating was allowed to dry in air for 10 mins. The other specimen was left uncoated.
3. A suspension of brazing alloy powder, conforming to BS.1845 N15 in 'Tensol' cement (available from I.C.I. Limited) was applied through a hypodermic syringe as a bead on to the unpainted area at the top of the coated specimen, and on a similar area on the uncoated specimen. This was allowed to dry in air for 10 mins.
4. The specimens were heat treated in a vacuum furnace at 1,120°C for 10 minutes, using a vacuum of approximately $5 \times 10^{-4}$ mm of Mercury. The specimens were cooled under vacuum conditions and below 950°C, with nitrogen gas.
5. The coated specimen, when observed after cooling, showed the brazing alloy to have melted and to have run to the edge of the coating, but not to have encroached on to the coating.

The uncoated specimen showed the brazing alloy to have run down to the bottom of the vertical surface.

Example 2

Preparation (2) was prepared according to the previously described method. Two rectangular blanks of the alloy known as Nimonic 80 were bent through 90° so as to present a vertical surface and were treated as follows:

1. The metal surfaces being particularly greasy were paraffin washed and then degreased with trichlorethylene vapour to remove organic materials. Paint was removed by a suitable paint stripper.
2. As soon as possible after step (1) one vertical surface of one specimen was masked to leave an area unsprayed at the top of the specimen. Three coats of the mixture were sprayed on to the remainder of the vertical surface, each coat being allowed to dry in air before the next was applied. The other specimen was left uncoated.
3. A suspension of a brazing alloy powder, conforming to BS.1845 N16, in 'Tensol' cement was applied through a hypodermic syringe as a bead on to the unsprayed area at the top of the coated specimen, and on a similar area on the uncoated specimen. This was allowed to dry in air for ten minutes.
4. The specimens were heat treated in a vacuum furnace at 1,120°C for ten minutes, using a vacuum of approximately $5 \times 10^{-4}$ mm of Mercury. The specimens were cooled under vacuum conditions and below 950°C with nitrogen gas.
5. The coated specimens, when observed after cooling, showed the brazing alloy to have melted and to have run to the edge of the coating, but not to have encroached on to the coating. The uncoated specimen showed brazing alloy to have run down to the bottom of the vertical surface.

Example 3

Preparation (3) was prepared according to the previously described method. In this example two blanks of a martensitic steel known as 'Jethete' were used, and the preparation technique was substantially similar to that in example 1. The brazing alloy conformed to BS.1845 AU5, and the brazing temperature was 1,050°C. All other conditions and the final result were as example 1.

Example 4

Preparation (4) was prepared according to the previously described method. In this example two blanks of the nickel based alloy known as Nimonic 75 were used, and the preparation technique was substantially similar to that in example 2. In this example four coats of the mixture were sprayed, the brazing alloy conformed to BS.1845 N13, and the brazing temperature was 1,050°C. All other conditions and the final result were as example 2.

Example 5

Preparation (5) was prepared according to the previously described method. In this example two blanks of a cast nickel based alloy comprising 16% Cr, 10% Co, 8% Mo, 4% Al and 3 ½% Ti were used and held in a vertical position, as it is not possible to produce a 90° bend in this material. Otherwise, the preparation technique was substantially similar to that in example 1. The brazing alloy conformed to BS.1845 N15, and the brazing temperature was 1,190°C. All other conditions and the final result were as example 1.

Example 6

Preparation (6) was prepared according to the previously described method. In this example two blanks of an austenitic steel containing 18 percent of chromium and 8 percent of nickel were used, and the preparation technique was substantially similar to that in example 1. The brazing alloy conformed to BS.1845 N15 and the brazing temperature was 1,120°C. All other conditions, and the final result were as example 1.

Example 7

Preparation (5) was prepared according to the previously described method. In this example, two blanks of the nickel based alloy known as Nimonic 75 were used, and the preparation technique was substantially similar to that in example 1.

Over the applied brazing alloy, and over the areas where the brazing alloy was expected to run, a proprietory flux "Vapo-flux" (available from Wall Colomonoy Limited) was applied.

The specimens were heat treated in a hydrogen retort furnace at 1,120°C for 10 minutes. The hydrogen was dried to a dewpoint of better than −60°C. The specimens were cooled in hydrogen to 150°C, and then in nitrogen to room temperature.

The final result was as example 1.

Example 8

Preparation (2) was prepared according to the previously described method. In this example two blanks of an austenitic steel containing 18 percent of chromium and 8 percent of nickel were used.

The blanks were treated as follows:
1. The metal surfaces being particularly greasy were paraffin washed and then degreased with trichlorethylene vapour to remote organic materials. Paint was removed by a suitable paint stripper.
2. As soon as possible after step (1) one surface of one specimen was masked to leave an area unsprayed at the top of the specimen. Three coats of the mixture were sprayed on to the remainder of the vertical surface, each coat being allowed to dry before the next was applied. The other specimen was left uncoated.
3. The uncoated area was heated with an oxy-coal gas torch and a flux 'Easy-Flo' (potassium fluorosilicate/potassium fluoro-borate) stainless steel grade flux (obtainable from Johnson Matthey Ltd.) was melted on to the surface. A rod of brazing alloy, conforming to BS.1845 AG2 was fed into the flame and allowed to melt on to the surface of the metal. The flame was played on to the metal so that the braze alloy would run. This was done with both specimens.
4. After cooling the flux was removed by immersing a phosphoric acid/Lissapol mixture at 60°C.
5. The coated specimen showed the brazing alloy to have melted and to have run to the edge of the coating, but not to have encroached on to the area of the coating.

The uncoated specimen showed the brazing alloy to have run down to the bottom of the vertical surface.

Example 9

Preparation (3) was prepared according to the previously described method. In this example two blanks of a steel containing carbon, manganese, boron and molybdenum, known as 'Fortiweld' (obtainable from British Steel Corporation, United Steels Division) were used.

The blanks were treated as follows:

1. The metal surfaces being particularly greasy were paraffin washed and then degreased with trichlorethylene vapour to remove organic materials. Paint was removed by a suitable paint stripper.
2. As soon as possible after step (1) one surface of one specimen was painted with one coat of the mixture prepared as above, so that an area was left unpainted at the top of the specimen. The coating was allowed to dry in air for 10 minutes. The other specimen was left uncoated.
3. The uncoated area was heated with an oxy-coal gas torch and a potassium fluoro-silicate/potassium fluoro-borate flux (Tenacity No. 5 obtainable from Johnson Matthey Ltd.) was melted on to the surface. A rod of brazing alloy, conforming to BS.1845 4 was fed into the flame and allowed to melt on to the surface of the metal. The flame was played on to the metal so that the braze alloy would run. This was done with both specimens.
4. After cooling, the flux was removed by immersing in boiling water.
5. The coated specimen showed the brazing alloy to have melted and to have run to the edge of the coating, but not to have encroached on to the area of the coating.

The uncoated specimen showed the brazing alloy to have run down to the bottom of the vertical surface.

Example 10

Preparation (7) was prepared according to the previously described method. In this example, two blanks of the nickel based alloy known as Nimonic 75 were used, and the preparation technique was substantially similar to that in example 1. The brazing alloy conformed to BS.1845 N14 and the brazing temperature was 1,070°C. All other conditions and the final result were as in example 1.

Example 11

Preparation (8) was prepared according to the previously described method. In this example, two blanks of an austenitic steel containing 18 percent by weight of chromium and 8 percent by weight of nickel were used, and the preparation technique was substantially similar to that in example 1. The brazing alloy conformed to BS.1845 N15 and the brazing temperature was 1,120°C. All other conditions and the final result was as in example 1.

If the surface which has been protected from the products of said brazing operation is to be painted or otherwise provided with a surface coating subsequent to the brazing operation, it may be desirable to remove the clay film when the brazing operation has been completed.

Such removal may be effected by abrasive methods such as sound-blasting vapour blasting etc.

Although the invention has been described with reference to the foregoing examples in which the coating composition is painted or sprayed on to the surface to be protected, it will be readily apparent to those skilled in the art that other methods of application of the composition would be equally effective. Thus for example it may be advantageous in some circumstances to apply the coating composition by dipping.

We claim:

1. A method of brazing comprising the steps of coating at least part of at least one surface in the vicinity of a brazing operation which surface is in danger of having the products of said brazing operation deposited thereon and which is to be protected from contamination by said products, with at least one layer of a composition comprising a mixture of an organophilic cation-modified clay (as herinbefore defined) and a volatile organic vehicle, removing substantially all of said vehicle from said coating to leave a film of said clay on said at least one surface, and effecting said brazing operation.

2. A method of brazing as claimed in claim 1 wherein said coating composition also contains an additive which is a non-volatile organic substance having adhesive properties and capable of forming a dry film when mixed with said organophilic cation-modified clay.

3. A method of brazing as claimed in claim 2 wherein said non-volatile organic substance is an acrylic resin.

4. A method of brazing as claimed in claim 1 wherein said coating composition also contains an additive which is at least one non-volatile simple or complex refractory oxide having filling properties and capable of forming a dry film when mixed with said organophilic cation-modified clay.

5. A method of brazing as claimed in claim 1 wherein said organic vehicle has a boiling point of below 150°C at atmospheric pressure.

6. A method of brazing as claimed in claim 5 wherein said boiling point is below 100°C 7. A method of brazing as claimed in claim 1 wherein said composition contains from 2 to 50 parts by weight of said organophilic cation modified clay, and from 50 to 300 parts by weight of said volatile vehicle.

8. A method of brazing as claimed in claim 2 wherein said coating composition contains up to 50 parts by weight of said non-volatile organic additive.

9. A method of brazing as claimed in claim 4 wherein said coating composition contains up to 50 parts by weight of said non-volatile refractory oxide additive.

10. A method of brazing as claimed in claim 7 wherein the ratio of the weight of said organophilic cation-modified clay to the weight of said non-volatile organic additive is from 1:1 to 1:4.

11. A method of brazing as claimed in claim 1 wherein film on said at least one surface is not less than 5 microns in thickness.

12. A method of brazing as claimed in claim 11 wherein said film on said at least one surface is from 15 to 40 microns in thickness.

13. A method of brazing as claimed in claim 1 wherein said organophilic cation-modified clay is selected from the group comprising dimethyldioctadecyl ammonium montmorillonite, dodecylamine montmorillonite and dimethyldioctadecyl ammonium hectorite.

14. A method of brazing as claimed in claim 1 wherein said film is removed subsequent to said brazing operation.

15. A method of preparing a coating composition as claimed in claim 2 comprising the steps of:
   a. milling the weight of said organophilic cation-modified clay with three-fifths of the weight of said volatile liquid organic vehicle in a stainless steel ball mill for 4 hours
   b. diluting the mixture with the remaining two-fifths of the weight of said volatile liquid organic vehicle and the weight of said non-volatile organic substance
   c. milling the mixture for a further half an hour.

16. In a method of brazing metal surfaces including the steps of coating at least a portion of the surface of the metal to be brazed in the vicinity of the brazing operation to protect the underlying metal surface from the resulting molten brazing products and, after application of the coating, conducting the brazing operation, the improvement comprising applying as the coating a composition comprising an organophilic cation-modified clay, the clay having a major portion of the surface of the particles covered with alkyl or aryl organic radicals ionically coupled to the clay by means of an onium base, and a volatile organic vehicle, substantially all of which vehicle is removed prior to the brazing operation leaving a coating of clay on the underlying metal surface protecting the metal surface from the molten brazing products.

17. The method as claimed in claim 16 wherein said organophilic cation-modified clay is dimethyldioctadecyl ammonium montmorillonite, dodecylamine montmorrillonite or dimethyldioctadecyl ammonium hectorite.

18. The method as claimed in claim 16 wherein the coating composition also contains a non-volatile refractory oxide.

19. The method as claimed in claim 18 wherein the coating composition contains, in parts by weight, 2 – 50 parts organophilic cation-modified clay, 50 – 300 parts volatile organic vehicle and up to 50 parts refractory oxide additive.

20. In a method of brazing including the steps of coating at least part of at least one surface in the vacinity of a brazing operation which surface is exposed to having the products of the brazing operation deposited thereon and which is to be protected from contamination by said products and conducting the brazing operation, the improvement comprising applying as the coating at least one layer of a composition composed of an organophilic cation-modified clay and a volatile organic vehicle and thereafter removing substantially all of the organic vehicle from the coating leaving a film of the clay on the surface to which it is applied.

21. The method as claimed in claim 20 wherein the ratio of the weight of the organophilic cation-modified clay to the weight of the non-volatile organic additive is from 1:1 to 1:4.

* * * * *